United States Patent Office 2,979,445
Patented Apr. 11, 1961

2,979,445

PROCESS FOR CONVERTING CIS-ETHYLENIC COMPOUNDS TO THEIR TRANS-ISOMERS

Joe B. Lavigne and Irving E. Levine, Berkeley, Calif., assignors to California Research Corporation, San Francisco, Calif., a corporation of Delaware No Drawing. Filed Feb. 11, 1957, Ser. No. 639,175

11 Claims. (Cl. 204—154)

The present invention relates to a new process for converting cis-ethylenic compounds, i.e., those containing substituents on the carbon-to-carbon double bonds in the cis-configuration, to ethylenic compounds with the substituents on the carbon-to-carbon double bond in the transconfiguration. More particularly the invention relates to a process for converting cis-isomers of unsaturated carboxylic acids and their derivatives to the corresponding trans-isomers.

Because, in general, trans-isomers of ethylenic compounds are characterized by higher melting points and greater stability than their corresponding cis-counterparts, it has been desired for a long time to find effective process techniques for the substantially complete isomerization of cis-structures present in various organic materials, such as unsaturated carboxylic acids, their esters and salts, unsaturated alcohols and glycols, etc., to the corresponding trans-structures and thus to provide higher melting, more stable organic materials.

The prior art discloses the possibility of isomerizing cis-ethylenic materials to their corresponding trans-isomers by the action of heat, or by exposure to sunlight, with various chemical agents acting as catalysts. Catalysts, such as thiourea, cyclohexanone, hydrogen bromide, hydrogen iodide, potassium cyanate, iodine, bromine, thiazyl sulfides, sodium bromide, pyridine, etc., have been proposed to accelerate the isomerization.

While interconversion of the cis-compounds to the trans-compounds under the effect of ultraviolet light is entirely unpredictable and requires specialized glass equipment, heating of many cis-ethylenic materials is often undesirable because decomposition can occur in addition to isomerization to the trans-form. Furthermore, corrosiveness of some compounds at the temperatures heretofore employed for these isomerizations requires the use of special materials of construction for the reaction vessels.

In some cases, the reaction proceeds from the start to the very end extremely slowly and is consequently inefficient and economically impractical. In other cases, the conversion of a cis-compound to its trans-isomer, e.g., of maleic acid to fumaric acid, at first occurs very rapidly, particularly on exposure to sunlight, but soon slows down with the increasing formation and accumulation of the less soluble trans-isomer which absorbs the rays and thus prevents complete conversion of the cis-compound.

Despite long treating times, conversions are incomplete and, in many instances, the yields of the desired trans-materials fail to approach the figures required for an industrially effective and remunerative process. The proposed catalytic techniques require rapidly consumed, costly and unrecoverable catalysts. The visible light techniques necessitate employment of expensive glass equipment. Furthermore, the presence of even a slight impurity in the cis-ethylenic compound adversely affects and virtually prevents a successful production of the trans-isomer.

The few trials of applying the radiation emitted in radio-active transformations to induce isomerization of the cis-materials have been even less encouraging. Namely, it has been reported in the past that a cis-ethylenic material, such as maleic acid, may be converted to its trans-isomer, fumaric acid, by exposure to radium emanations; however, the yields of the trans-isomer, even after prolonged exposure from 3 to 4 months, were extremely low. A more recent attempt of exposing cis-octadecenes to a flux of slow neutrons similarly failed to provide an attractive yield of trans-isomers.

Thus, the various cost-increasing factors, such as special glass equipment, application of elevated temperatures and pressures, consumption of catalysts, unduly long treating times, and, particularly, the inability of the thermally-induced and the photochemically-induced isomerizations of cis-ethylenic compounds to provide trans-isomers in sufficiently high yields were responsible for the failure of the industry to adapt these isomerization techniques.

The present invention provides a new process which enables a rapid and efficient conversion of cis-ethylenic materials to their trans-isomers in high, substantially quantitative yields by subjecting the cis-materials to a high-energy, ionizing radiation in the presence of catalysts effective as initiators of a chain reaction under the influence of this radiation.

In view of the aforementioned failure of the prior art to achieve satisfactory yields of trans-isomers by thermal and photochemical techniques and by the use of radiations from radioactive sources, the production of high yields of trans-isomers by the process of the invention, as will be hereinafter described in detail, is entirely unexpected.

The radiation supplied to the cis-ethylenic material to convert it to the corresponding trans-ethylenic material may be either electromagnetic or corpuscular radiation, and should be of a sufficiently high energy to achieve an adequate ionization in the reaction space. Examples of electromagnetic ionizing radiation are gamma rays and X-rays, while corpuscular ionizing radiation may be applied as alpha particles, beta particles (rays), neutrons, protons, and deuterons. All of these radiations, directly or indirectly, occasion the ionization of a portion of the molecules of the cis-ethylenic materials in the reaction space.

Protons, deuterons, alpha and beta particles and X-rays can be produced directly or indirectly from particle accelerators, such as a Van de Graaff generator. Gamma rays may be obtained from waste fission products or pure radioactive isotopes, such as cobalt-60 or cesium-137. Neutrons may be obtained in a nuclear reactor or from different nuclear reactions induced by particle accelerators.

Any suitable source of ionizing radiation, located either inside or outside the reaction vessel which contains the cis-material, may be employed for the purposes of the invention. The minimum of energy which would permit the conversion to the trans-isomer is about 0.001 mev. The maximum may be as high as 20.0 mev., although energies from about 0.5 mev. to about 12.0 mev. are preferably employed to assure the desired quantitative conversions of the cis-isomers to the trans-isomers and to minimize the occurrence of side-reactions which are apt to reduce the ultimate yield of the trans-isomers.

Beta rays and gamma rays represent the preferred types of radiations to be used in the practice of the invention because these rays may be readily obtained with sufficient energy to pass easily through the walls of the glass and metal equipment which contain the material to be irradiated.

The total dose of radiation may vary from a minimum of 0.001 megarep. to as high as 25.0 megareps., the preferred practical range being from about 0.01 to about 10.0 megareps. The cis-ethylenic material is exposed to radiation sufficiently long to accumulate the total dose effective to convert it to the trans-isomer. In general, this is achieved in a few minutes. The temperature and pressure have no appreciable effect on the rate of conversion and, for all practical purposes, the radiation treatment may be carried out at room temperature and under atmospheric pressure.

Any catalyst capable of initiating a chain reaction under the influence of ionizing radiation may be employed in the conversion of the cis-organic materials to the trans-organic materials.

Examples of such a catalyst are: sulfur dioxide, hydrogen sulfide, nitrogen tetroxide, bromine, alkyl halides (e.g., propyl iodide), alkyl nitrites (e.g., ethyl nitrite), hydrogen bromide, etc. It has been found that particularly effective catalysts are those selected from the group consisting of bromine, iodine, and corresponding soluble alkyl bromides and alkyl iodides and soluble salts of hydrobromic and hydriodic acids, such as sodium bromide, potassium iodide, and the like.

The radiation is preferably carried out by dissolving the cis-material in a solvent which is immiscible with the trans-isomer resulting from the isomerization. The employment of such a solvent, provided it does not interfere with the initiating action of the catalyst, facilitates the recovery of the final trans-isomer product. The catalysts are usually employed in proportions ranging from 0.001 to 2.0% by weight of the solution. For instance, maleic acid, subjected to high-energy radiation in an aqueous solution with bromine as the catalyst, preferably in amounts from 0.01 to 1.0% based on the entire solution, is effectively converted to fumaric acid. Likewise, oleic acid, dissolved in a suitable hydrocarbon solvent, such as cyclohexane, with sulfur dioxide as the catalyst, is readily converted by high-energy ionizing radiation to the trans-isomer, elaidic acid.

Among suitable materials which can be irradiated as hereinbefore described, may be mentioned unsaturated cis-monocarboxylic acids, such as, isocrotonic, angelic, oleic, cis-hydroxycinnamic, cis-cinnamic, alpha-chloro-isocrotonic, beta-bromo-isocrotonic, cis-4-methyl-2-pentenoic, cis-6-octa-decenoic and erucic; unsaturated cis-dicarboxylic acids such as maleic, chloromaleic, citraconic, cis-alpha-methylglutaconic, cis-beta-methylglutaconic, and cis-dihydromuconic; various esters and salts of the aforementioned cis-acids; also unsaturated alcohols, such as nerol; and cis-ethylenic glycols, e.g., 2-butene-1 : 4-diol. In fact, any material containing cis-substituents on the ethylenic linkage can be converted to its corresponding trans-counterpart in accordance with the invention.

The following example of the isomerization of citraconic acid to mesaconic acid is typical of the conversion of a cis-ethylenic compound to its trans-isomer by employing ionizing radiation in accordance with the invention.

Example 1

Citraconic acid (9 g.) dissolved in 25 ml. of water was placed into a 200 ml. of glass beaker, and two drops of bromine were added to the solution. The contents of the beaker at room temperature were then exposed to beta radiation for 3.5 minutes. The source of radiation was a traveling wave electron accelerator (6 mev.). The solution was stirred vigorously throughout the exposure by means of a magnetic stirrer. The dose rate was 6 megareps. per minute. A precipitate was formed, and, after the radiation was discontinued, it was filtered, dried and identified as mesaconic acid (3.75 g.). The amount of mesaconic acid which remained dissolved in the irradiated solution was estimated on the basis of its known solubility in water. The total yield of mesaconic acid obtained in this example was more than 85% of the theory.

A further illustration of the process of the present invention is furnished by the examples of beta-ray radiation of oleic acid and refined soybean oil.

Example 2

In this case 7.1 g. of oleic acid and 1.1 g. of liquid sulfur dioxide were mixed in a small (20 cc.) coiled aluminum tube (3/8" dia.; 1/32" wall thickness). The tube was then exposed to beta rays using a resonant transformer as the source of energy (1 mev.). The rate employed was 0.07 megarep. per second until a total dose of 11 megareps. has been applied. The temperature was less than 50° C. at the end of the irradiation. After discontinuing the radiation, the contents of the tube were removed and partitioned between benzene and water. A semi-solid containing about 0.2% of sulfur was recovered from the benzene layer. The white solid material, ultimately recovered on centrifuging and repeated recrystallization of this semi-solid from ethanol, was identified as elaidic acid.

Example 3

Liquid sulfur dioxide was bubbled to saturation into a similar coiled aluminum tube containing 20 g. of refined soybean oil (which is composed mainly of esters of cis-carboxylic acids, oleic and linoleic). This tube was exposed to beta-ray radiation from a resonant transformer (1 mev.) at a rate of 0.03 megarep. per second until a total dose of 25 megareps. had been applied. The irradiated oily mixture was withdrawn from the tube, steam-stripped to remove sulfur dioxide and subjected to infrared analysis. The results of this latter indicated that the ultimately recovered product contained esters of trans-carboxylic acids instead of the original esters of cis-carboxylic soybean oil acids. The sulfur content of this material was less than 0.02%.

The results of Examples 2 and 3, illustrating the operation of the invention, indicate the possibility of upgrading various fats and oils by converting cis-isomeric materials to higher-melting, more stable trans-isomeric materials. This represents a particularly desirable advantage in the case of edible oils and fats, as well as in the case of oils intended for use in the manufacture of synthetic resins. The more stable, higher-melting trans-materials are less susceptible to turning rancid and to deterioration on storage and, furthermore, are more easily handled and packaged.

An additional example of the operation of the process of this invention is that of the conversion of maleic acid to fumaric acid, a material for which there exists considerable industrial demand.

Example 4

In this instance 225 g. of pure maleic acid was dissolved in 1300 g. of water, and a 100 ml. aliquot of this solution was placed in a 600 ml. glass beaker into which 1 ml. of bromine was added. The glass beaker containing the solution was exposed to beta-radiation using as a source of radiation energy a traveling wave electron accelerator (6–7 mev.). The radiation was applied at a rate of 3.5 megareps. per minute to a total cumulative dose of 10 to 15 megareps. During the exposure the solution was thoroughly stirred with the aid of a magnetic stirrer. A white precipitate of fumaric acid was recovered from the irradiated solution in a yield of about 98% of the theory based on maleic acid.

It is apparent from the above example that high-energy radiation offers an efficient means for the production of fumaric acid from maleic acid. However, maleic acid available in the industry is usually supplied in the form of crude aqueous maleic acid liquors, invariably contaminated with various impurities. These form in the course of catalytic oxidations of aromatic hydrocarbons, such as benzene, orthoxylene, naphthalene, etc., commonly employed for the production of phthalic and maleic acids. These impurities in maleic acid liquors, even though minute, usually interfere with the efficient isomerization of maleic acid to fumaric acid, occasioning low recoveries of a poorly colored fumaric acid product, as may be seen from the following example.

*Example 5*

A charge of crude maleic acid liquor (100 ml.) containing about 19.1 weight percent maleic acid and obtained in the manufacture of phthalic anhydride by catalytic vapor-phase oxidation of ortho-xylene, was subjected to beta-radiation in the same equipment and under substantially the same conditions as in Example 4. However, owing to the presence of impurities in the charge, irradiation at a rate of 3.5 megareps. per minute to a total cumulative dose which ranged from 10 to 15 megareps. did not result in the production of any significant quantities of fumaric acid. The quantity of the bromine catalyst was successively increased in different runs of this test series, but even through as much as 6% of bromine (based on the weight of the charge) was employed, the total yield of fumaric acid was never greater than 28%.

In order to eliminate the adverse effect of impurities in the maleic acid liquors on the conversion of maleic acid to fumaric and to permit employment of such liquors for an efficient production of fumaric acid in accordance with the radiation technique of the present invention, the crude liquor of Example 5 was submitted to a pretreatment with chlorine prior to the irradiation, as described in the next example.

*Example 6*

A 100 ml. aliquot of the dark colored crude maleic acid liquor, such as was used in Example 5, containing the same proportion (19.1%) of maleic acid, was pretreated with chlorine by bubbling the latter through the liquor charge for a period of 2–4 minutes, the total amount of chlorine thus employed ranging up to 2%, based on the weight of the liquor charge. Thereupon, bromine (0.4 to 0.7 g.) was added to the solution in a 600 ml. glass beaker, and this solution was then subjected to beta-ray radiation from an electron accelerator (8 mev.), the solution being thoroughly stirred during the radiation treatment with a magnetic stirrer. The rate of radiation was 1.8 megareps. per minute applied for a period of 1 to 2 minutes. After discontinuing the radiation, the resultant slurry was filtered and washed with water, after which the solid crude fumaric acid product was dried in vacuo. The yield of fumaric acid in this test series ranged from 88–97%. The color of the fumaric acid product was substantially white as contrasted with the dark color of the fumaric acid obtained from crude maleic acid liquors in the absence of the chlorine pretreatment.

It is to be understood that the invention as illustrated by the specific examples hereinabove is not in any way limited thereby and that many and varied modifications of the invention may be made without departing from the spirit and scope thereof and shall be includible in the definitions of the appended claims.

We claim:

1. A process for the conversion of cis-ethylenic compounds to the corresponding trans-isomers thereof, which comprises subjecting a cis-ethylenic compound at substantially atmospheric temperatures and pressures to ionizing radiation having an energy from about 0.001 mev. to about 20.0 mev. for a period of time sufficient to impart a total radiation dose of from 0.001 to 25.0 megareps. in the presence of a catalyst capable of initiating a chain reaction under the influence of said ionizing radiation.

2. A process for the conversion of cis-ethylenic compounds to the corresponding trans-isomers thereof, which comprises subjecting a cis-ethylenic compound at substantially atmospheric temperatures and pressures to ionizing radiation having an energy from about 0.5 mev. to about 12.0 mev. for a period of time sufficient to impart a total radiation dose of from 0.001 to 25.0 megareps. in the presence of a catalyst capable of initiating a chain reaction under the influence of said ionizing radiation.

3. A process for the conversion of cis-ethylenic compounds to the corresponding trans-isomers thereof, which comprises subjecting a cis-ethylenic compound at substantially atmospheric temperatures and pressures to ionizing radiation having an energy from about 0.001 mev. to about 20.0 mev. for a period of time sufficient to impart a total radiation dose of from 0.001 to 25.0 megareps. in the presence of a catalyst capable of initiating a chain reaction under the influence of said ionizing radiation and selected from the group consisting of bromine, iodine, low molecular weight soluble alkyl bromides and alkyl iodides and soluble salts of hydrobromic and hydriodic acids.

4. A process for the conversion of cis-ethylenic compounds to the corresponding trans-isomers thereof, which comprises subjecting a cis-ethylenic compound at substantially atmospheric temperatures and pressures to ionizing radiation having an energy from about 0.5 mev. to about 12.0 mev. for a period of time sufficient to impart a total radiation dose of from 0.001 to 25.0 megareps. in the presence of a catalyst capable of initiating a chain reaction under the influence of said ionizing radiation and selected from the group consisting of bromine, iodine, low molecular weight soluble alkyl bromides and alkyl iodides and soluble salts of hydrobromic and hydriodic acids.

5. A process as defined in claim 1, wherein said cis-ethylenic compound is selected from the group consisting of unsaturated cis-carboxylic acids and their esters and salts.

6. A process as defined in claim 1, wherein said cis-ethylenic compound is exposed to a total radiation dose from about 0.01 megarep. to about 10.0 megareps.

7. A process as defined in claim 2, wherein said cis-ethylenic compound is selected from the group consisting of unsaturated cis-carboxylic acids and their esters and salts.

8. A process for the conversion of maleic acid to fumaric acid, which comprises subjecting maleic acid at substantially atmospheric temperatures and pressures to ionizing radiation having an energy from about 0.001 mev. to about 20.0 mev for a period of time sufficient to impart a total radiation dose of from 0.01 to 10.0 megareps. in the presence of a catalyst capable of initiating a chain reaction under the influence of said ionizing radiation and selected from the group consisting of bromine, iodine, low molecular weight soluble alkyl bromides and alkyl iodides and soluble salts of hydrobromic and hydriodic acids.

9. A process for the conversion of maleic acid to fumaric acid, which comprises subjecting maleic acid at substantially atmospheric temperatures and pressures to ionizing radiation having an energy from about 0.5 mev. to about 12.0 mev. for a period of time sufficient to impart a total radiation dose from 0.01 to 10.0 megareps. in the presence of bromine as the catalyst for initiating a chain reaction under the influence of said ionizing radiation.

10. A process for the conversion of cis-ethylenic compounds to the corresponding trans-isomers thereof, which comprises subjecting a cis-ethylenic compound at substantially atmospheric temperatures and pressures to ionizing radiation having an energy from about 0.001 mev. to about 20.0 mev. for a period of time sufficient to impart a total radiation dose of from 0.01 to 10.0 megareps. in the presence of sulfur dioxide catalyst.

11. A process for the conversion of oleic acid to elaidic acid, which comprises subjecting oleic acid at substantially atmospheric temperatures and pressures to ionizing radiation having an energy from about 0.5 mev. to about 12.0 mev. for a period of time sufficient to impart a total radiation dose of from 0.01 to 10.0 megareps in the presence of sulfur dioxide as the catalyst for initiating a chain reaction under the influence of said ionizing radiation.

References Cited in the file of this patent

UNITED STATES PATENTS

| | | |
|---|---|---|
| 2,441,238 | Dunlop | May 11, 1948 |
| 2,704,296 | Dobratz | Mar. 15, 1955 |
| 2,816,922 | Stephenson | Dec. 17, 1957 |

OTHER REFERENCES

Bourne et al.: Chem. and Ind., November 24, 1956, pp. 1372–1376.

Charlesby: Radiation Research, February 1955, pp. 96–107.

Collinson et al.: "Chemical Reviews," vol. 56, No. 3, page 498, June 1956.